(12) United States Patent
Ballocca et al.

(10) Patent No.: US 8,542,868 B2
(45) Date of Patent: Sep. 24, 2013

(54) EMBEDDING INTERACTIVE DATA INTO AN AUDIOVISUAL CONTENT BY WATERMARKING

(75) Inventors: Giovanni Ballocca, Turin (IT); Roberto Borri, Nole (IT); Roberto Caldelli, Pian di Scò (IT); Rudy Becarelli, Pistoia (IT); Francesco Filippini, Marcello Pistoiese (IT)

(73) Assignees: CSP—Innovazione Nelle ICT Scarl, Turin (IT); Universita' Degli Studi di Firenze, Florence (IT); S.I.SV.EL. S.p.A. Societa' Italiana per Lo Sviluppo Dell'Elettronica (IT)

( * ) Notice: Subject to any disclaimer, the term of this patent is extended or adjusted under 35 U.S.C. 154(b) by 418 days.

(21) Appl. No.: 12/808,896

(22) PCT Filed: Dec. 17, 2008

(86) PCT No.: PCT/IB2008/003515
§ 371 (c)(1),
(2), (4) Date: Oct. 11, 2010

(87) PCT Pub. No.: WO2009/077849
PCT Pub. Date: Jun. 25, 2009

(65) Prior Publication Data
US 2011/0019870 A1    Jan. 27, 2011

(30) Foreign Application Priority Data
Dec. 17, 2007    (IT) .............................. TO2007A0906

(51) Int. Cl.
G06K 9/00    (2006.01)
G06K 9/46    (2006.01)

(52) U.S. Cl.
USPC ............................. 382/100; 382/248; 382/250

(58) Field of Classification Search
USPC .......................................... 382/100, 248, 250
See application file for complete search history.

(56) References Cited

U.S. PATENT DOCUMENTS

| 6,411,725 B1* | 6/2002 | Rhoads ........................ 382/100 |
| 6,725,372 B1 | 4/2004 | Lewis |

(Continued)

FOREIGN PATENT DOCUMENTS

| WO | WO0101331 | 1/2001 |
| WO | WO0106455 | 1/2001 |
| WO | WO0155889 | 8/2001 |

OTHER PUBLICATIONS

Cross D et al: "Watermarking for Self-authentication of Compressed Video", IEEE ICIP 2002 vol. 2, Sep. 22, 2002, pp. 913-916.

(Continued)

Primary Examiner — Utpal Shah
(74) Attorney, Agent, or Firm — Buchanan Nipper (57) ABSTRACT

A method for referencing and interconnecting contents, applications and metadata to an audiovisual content is described, especially for iTV of for distribution on DVD, which comprises the step of inserting a digital watermark into the audiovisual content during an audiovisual content encoding step, the digital watermark being possibly used for allowing a user to reproduce or exploit additional contents supplementing those provided by the audiovisual content, wherein the digital watermark is inserted into the audiovisual content as data frame with header and body by subdividing it into a plurality of consecutive 'I' frames and forcing the parity of LSBs of mid-frequency providing an auxiliary watermark channel, e.g. in an MPEG2 transport stream.

23 Claims, 6 Drawing Sheets

(56) References Cited

U.S. PATENT DOCUMENTS

| | | | |
|---|---|---|---|
| 7,020,304 B2 * | 3/2006 | Alattar et al. | 382/100 |
| 7,333,716 B2 * | 2/2008 | Kuroda | 386/252 |
| 7,643,649 B2 * | 1/2010 | Davis et al. | 382/100 |
| 7,930,546 B2 * | 4/2011 | Rhoads et al. | 713/176 |
| 7,961,949 B2 * | 6/2011 | Levy et al. | 382/190 |
| 8,107,674 B2 * | 1/2012 | Davis et al. | 382/100 |
| 2002/0066111 A1 | 5/2002 | Rodriguez | |
| 2002/0090114 A1 | 7/2002 | Rhoads et al. | |
| 2002/0162118 A1 * | 10/2002 | Levy et al. | 725/110 |
| 2002/0194480 A1 | 12/2002 | Nagao | |
| 2003/0192060 A1 * | 10/2003 | Levy | 725/133 |
| 2010/0322470 A1 * | 12/2010 | Rodriguez | 382/100 |

OTHER PUBLICATIONS

Gerhard C Langelaar et al: "Watermarking Digital and Video Data, A State-of-the-ad Overview", IEEE Signal Processing Magazine, IEEE Service Center, Piscataway, NJ, US, vol. 17, No. 5, Sep. 1, 2000, pp. 28, 36.

International Search Report for PCT/IB2008/003515, Jun. 2010.

Written Opinion of the International Searching Authority for PCT/IB2008/003515, Jun. 2010.

* cited by examiner

EMBEDDING INTERACTIVE DATA INTO AN AUDIOVISUAL CONTENT BY WATERMARKING

The present invention relates to a method for referencing and interconnecting contents, applications and metadata to an audiovisual content.

More in particular, the present invention relates to a method which allows to exploit enriched audiovisual content and to expand a user's fruition experience.

The development of systems for enriching the fruition of audiovisual contents, in particular of television contents, with interactive contents dates back to the '50s of last century. After the first fanciful attempts aiming at allowing the spectator to interact with the evolution of the events described by the broadcast program, e.g. by overlapping glossy paper on the screen in order to draw objects for cartoons' characters, other systems have become widespread wherein the broadcast audio/video stream is flanked by data streams. Such systems are typically characterized by a cyclic transmission model to which the user accesses through suitable applications and/or apparatuses, e.g. like teletext, which has been broadcast since the early '70s.

The introduction of digital encoding and transmission techniques has given a new boost to the field of interactive applications, which generally exploit the possibility of using the transmission channel for distributing a variable number of parallel data streams that may carry applications, metadata or accessory data in addition to the audio/video content.

Also, the quick evolution of consumer electronic devices, such as digital receiver terminals, and its convergence with internetworking technologies, the success of which is based on the adoption of open standards for supporting application interoperability, have allowed for the development of tools adapted to use at best the broadcasting channel as a means for distributing multimedia and application contents to a potentially unlimited number of users (e.g. in satellite broadcasting, the number of users that can be reached by the service only depends on the "footprint" covered by the signal), as well as to use the telecommunication channel for carrying out customized transactions.

For all platforms which adopt the MPEG2-TS standard as a basic content distribution tool, such as the ATSC, DVB and ISDB platforms, the possibility of implementing and distributing interactive television applications is generally ensured by two key elements:

the television signal transmitted digitally carries a service aggregate, i.e. a serial stream created by multiplexing, in appropriate variable proportions determined as a function of the bitrate of the original stream, packets belonging to parallel streams that transport encoded audio/video signals compressed according to different techniques and/or data streams and/or applications;

the user terminal used for receiving and reproducing the broadcast programs is provided with suitable software components which allow the application to be accessed and downloaded from the broadcast stream and then executed. In some variants, the software components installed in the user terminal may already include applications (e.g. microbrowser, e-mail client, "Electronic Program Guide"—EPG) which are used for accessing or consulting broadcast data and optionally for carrying out transactions over the return channel.

The tools currently in use for developing interactive applications can be subdivided into two classes:

"proprietary" tools, which utilize application distribution protocols and software components, the execution specifications of which have not been made public;

"open" tools, wherein the protocol and software component specifications for supporting the development, distribution and execution of interactive applications have been made public, typically under the control of a "super partes" standardization body.

In the former case, the service production, distribution and fruition chain is a closed one: broadcasters, service developers and end users refer to the single supplier, or group of suppliers, which controls the technologic tools and can produce every object, from production apparatuses to user terminals, that make up the service distribution chain.

In the latter case, the system based on public specifications allows for the presence on the market of a plurality of independent parties, who may produce apparatuses and tools certified for standard compliance and interoperability.

A typical example of an open system is the DVB-MHP platform, which specifies a set of software components that allow for the development of portable applications, i.e. executable on terminals of different brands and models, provided that they are compliant with the specifications.

Along with these tools, different systems have also been proposed and implemented for referencing contents and applications during the reproduction of audiovisual contents for the purpose of integrating and expanding the end user's content fruition experience.

In general, such systems are based on the possibility of injecting a certain quantity of accessory data into the audio and video streams during the encoding and compression stage, while trying not to alter significantly the quality of the content presented to the user.

A typical example of a first class of such systems is the DVB-MHP platform.

Said platform has been initially developed for the purpose of supporting the development of interactive applications within the scope of digital broadcasting over satellite, cable or terrestrial networks, to be subsequently expanded for the distribution of services over IP networks. See, for example, the architecture for "IP Television" as specified by the DVB-IPI standard.

In this case, the possibility of implementing and distributing interactive applications is limited to the fact that the audio/video content and application code distribution means consists of the MPEG 2 Transport Stream, and that the signalling content and, in some cases, also the application execution content require the management of "Service Information" (SI). This system remains therefore strictly limited to television-type fruition platforms, without any possibility of off-line fruition or fruition over telecommunication networks.

Besides, the fruition of interactive applications is limited to terminals which have been prearranged and certified for such use, thus very much limiting the user's access freedom.

Finally, in the specific case of DVB-MHP, no means are provided for referencing/interconnecting integrative contents with respect to the audio/video channel, nor any specific means have been defined for activating predefined application functions at predetermined time instants during the reproduction of the audio/video stream, with the additional consequence that no possibility is given to synchronize the behaviour of an interactive application closely with the audio/video content.

A typical example of a second class of such systems is described in international patent application no. WO 01/55889.

Said document illustrates the use of steganographic techniques, in particular digital watermarking, for inserting a certain quantity of application information into the audio/video stream. According to the system illustrated in said document, the user terminal can connect, via telecommunication access, to a back-end application which presents integrative contents, such as for such as, example, "T-commerce" applications. As the content is being reproduced, the user's device detects the presence of a watermark during the decoding step and connects to the back-end system by sending the watermark content. The back-end application identifies which content, among the manageable ones, meets the received request and sends it in response to the request of the user terminal that is reproducing the content.

The system described in document WO 01/55889 provides for prearranging a complete client-server system, wherein the service manager must deal with both the production/distribution of the audio/video content and the prearrangement/distribution of the integrative content.

No referencing can however be made to any contents external to the system, such as web sites managed by third parties.

In addition, the user terminal necessarily requires a connection to a return channel over which the request must be sent to the back-end application.

A further example of the second class of systems for referencing contents and applications during the reproduction of audiovisual contents for the purpose of integrating and expanding the end user's content fruition experience is described in international patent application no. WO 01/01331.

Said international patent application describes the use of digital watermarking techniques for referencing application and/or integrative contents starting from the reproduction of audiovisual/multimedia contents accessible through a connection over a return channel and/or through storage devices available in the reproduction apparatus, or even distributed in the fowl of a parallel stream multiplexed with the main audiovisual stream.

However, the system described in international patent application WO 01/01331 suffers from at least three drawbacks:

a) the size of the application payload of the digital watermark is not specified and, in particular, no solutions are provided for the case in which the payload size is such that, if placed at a single point within the audiovisual content, it can adversely affect the quality of said content, e.g. by significantly reducing the signal/noise ratio or by causing the presence of artifacts in the decoded image;

b) no method is specified for a "secure" identification of the digital watermark; it should be observed that in this case there is an anomalous utilization of digital watermarking techniques. In fact, unlike the current practice, the watermark does not have to meet particular robustness or secrecy requirements. On the contrary, in order to facilitate the decoding operations, it is necessary that it can be identified quickly and with certainty, without any risk of generating "false positives";

c) no reference is made to a possible compliance/non-compliance with the encoding/decoding standards, e.g. MPEG2, of the multimedia contents currently in use in the world of digitally distributed multimedia services, such as television broadcasting, or for the production of contents for off-line fruition, such as DVDs.

The object of the present invention is therefore to provide a method for referencing and interconnecting contents, applications and metadata to an audiovisual content that can be used independently of the type of platform on which it is being used.

It is a further object of the present invention to provide a method for referencing and interconnecting contents, applications and metadata to an audiovisual content that generates no artifacts in the encoded audiovisual stream.

It is a further object of the present invention to provide a method for referencing and interconnecting contents, applications and metadata to an audiovisual content that generates a digital watermark which can be easily identified within an audiovisual stream.

It is a further object of the present invention to provide a method for referencing and interconnecting contents, applications and metadata to an audiovisual content that complies with the standards in which it is implemented.

It is a further object of the present invention to provide a method for referencing and interconnecting contents, applications and metadata to an audiovisual content that allows for referencing contents which are external to the system.

These and other objects of the invention are achieved by the method as claimed in the appended claims, which are intended as an integral part of the present description.

In short, the method according to the invention allows to create a platform for producing interactive television applications, which platform can be used independently of the access means employed for enjoying the content, whether "live", such as television broadcasting or multicast streaming, or "on-demand", such as unicast streaming upon a user's request, or fruition from any storage format, such as a DVD, a file stored on a hard disk, a USB peripheral, and so on.

The above objects will become more apparent from the detailed description of the method according to the invention, with particular reference to the annexed figures, wherein.

Within this context, the expression "main content" refers to an audio/video content which is encoded by using a device and a method according to the present invention. The fruition of the main content through the device and method according to the present invention allows the user to access all integrative contents, whether applications or hypermedia/hypertext.

In this frame, the expression "application data" refers to any type of digitally represented contents, whether in "raw" format or in a format encoded and/or compressed by means of appropriate techniques, which can be reproduced/exploited through suitable application components, whether hardware or software, that can be automatically associated with the content, e.g. through mechanisms such as "magic number", i.e. a special constant, or "mime-type", i.e. a two-part identifier, or through a search in a "look-up table". As an alternative, the application data may be applications to be started automatically or upon the user's request.

Figure 1:
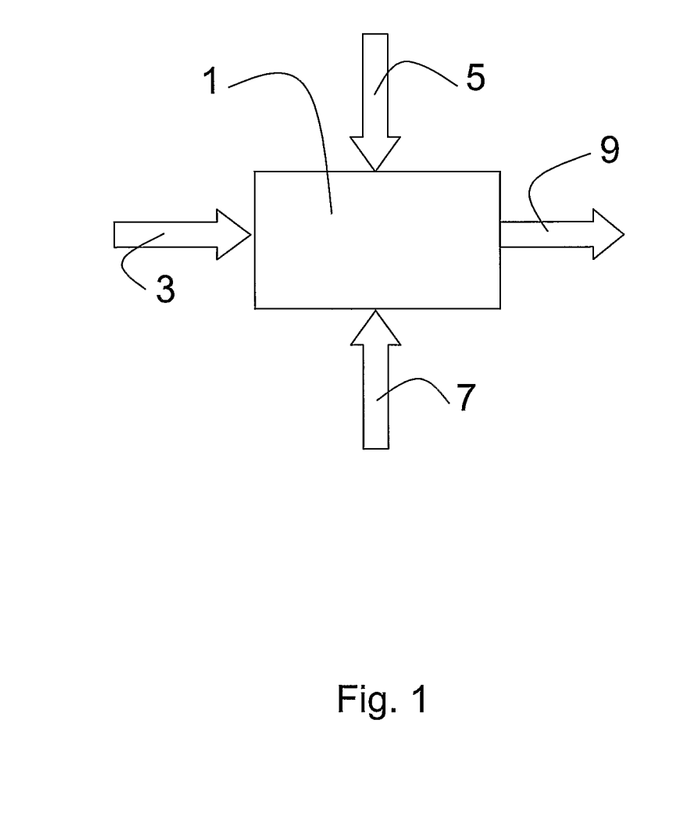
FIG. 1 shows an encoder and a step of inserting a digital watermark into a non-encoded digitalized audio/video stream.

With reference to FIG. 1, the following will now describe a step of inserting a digital watermark into a generalized audio/video stream, wherein a generic encoder 1, e.g. compliant with the MPEG2 standard specifications, is inputted three distinct data streams: a non-encoded audio/video stream 3, a digital watermark 5 and encoding parameters 7, and outputs an encoded audio/video stream 9 in which said digital watermark 5 has been inserted.

Digital watermark 5 is inserted at one or more time instants, or frames, of non-encoded audio/video stream 3.

Digital watermark 5 is inserted simultaneously during the step of encoding, e.g. MPEG-2, non-encoded audio/video stream 3, possibly by modifying at least one coefficient of the DCT ("Discrete Cosine Transform") of the 8×8-pixel blocks into which every single frame of non-encoded audio/video stream 3 is subdivided.

Any modification of the coefficients is carried out exclusively on "I" frames (Intra-frames), not on "B" or "P" frames (predicted frames).

In order to insert a bit with a value of "1" or "0" of digital watermark 5, the non-parity/parity of the selected DCT coefficients may be forced as clarified below.

Figure 2:
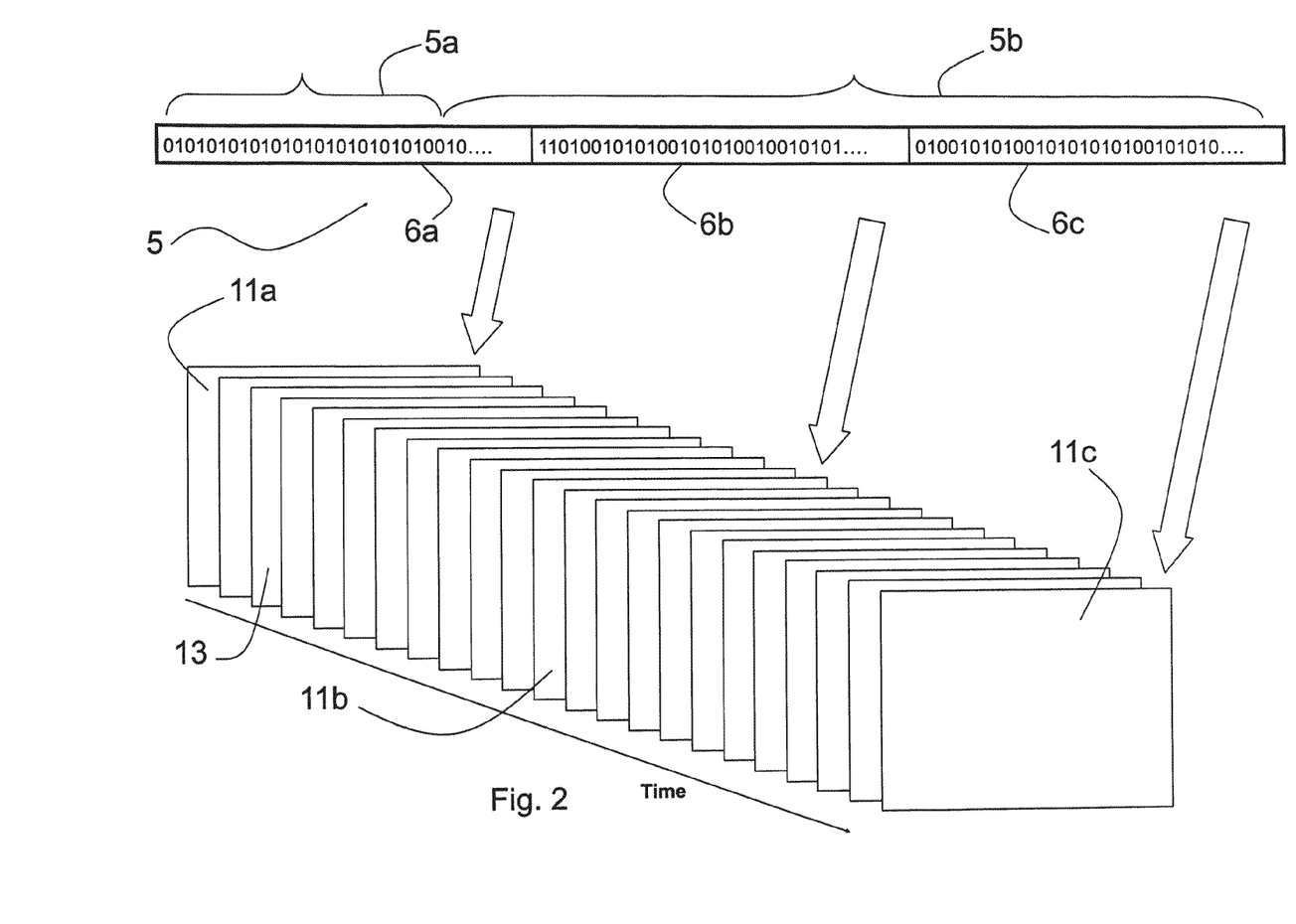
FIG. 2 shows a structure of a digital watermark inserted into the digitalized audio/video stream.

Referring now to FIG. 2, there is shown the structure of a digital watermark 5 consisting of a sequence, for example, of 360 information bits, i.e. 45 bytes, subdivided into three groups 6a,6b,6c of 120 bits each, i.e. 15 bytes.

Not all of the 360-bit sequence has information content. In fact, the first 24 bits, i.e. 3 bytes, of each digital watermark 5 make up a header 5a having a specific predefined format, which is necessary for determining whether a certain "I" frame contains a digital watermark 5 or not. The remaining 336 bits, i.e. 42 bytes, represent an actual payload 5b of digital watermark 5, i.e. the information content used for indicating a signalling in encoded audio/video stream 9.

Each group 6a,6b,6c is inserted into a respective "I" frame 11a,11b,11c of non-encoded audio/video stream 3. Among the "I" frames 11a,11b,11c, there are a plurality of "B" or "P" frames 13. The frames 11a, 11b and 11c are thus three consecutive "I" frames.

In the present exemplifying description, three consecutive "I" frames are used for inserting the digital watermark. According to alternative embodiments, two or more consecutive "I" frames may be used, depending on the size of the application payload to be carried.

Figure 3:
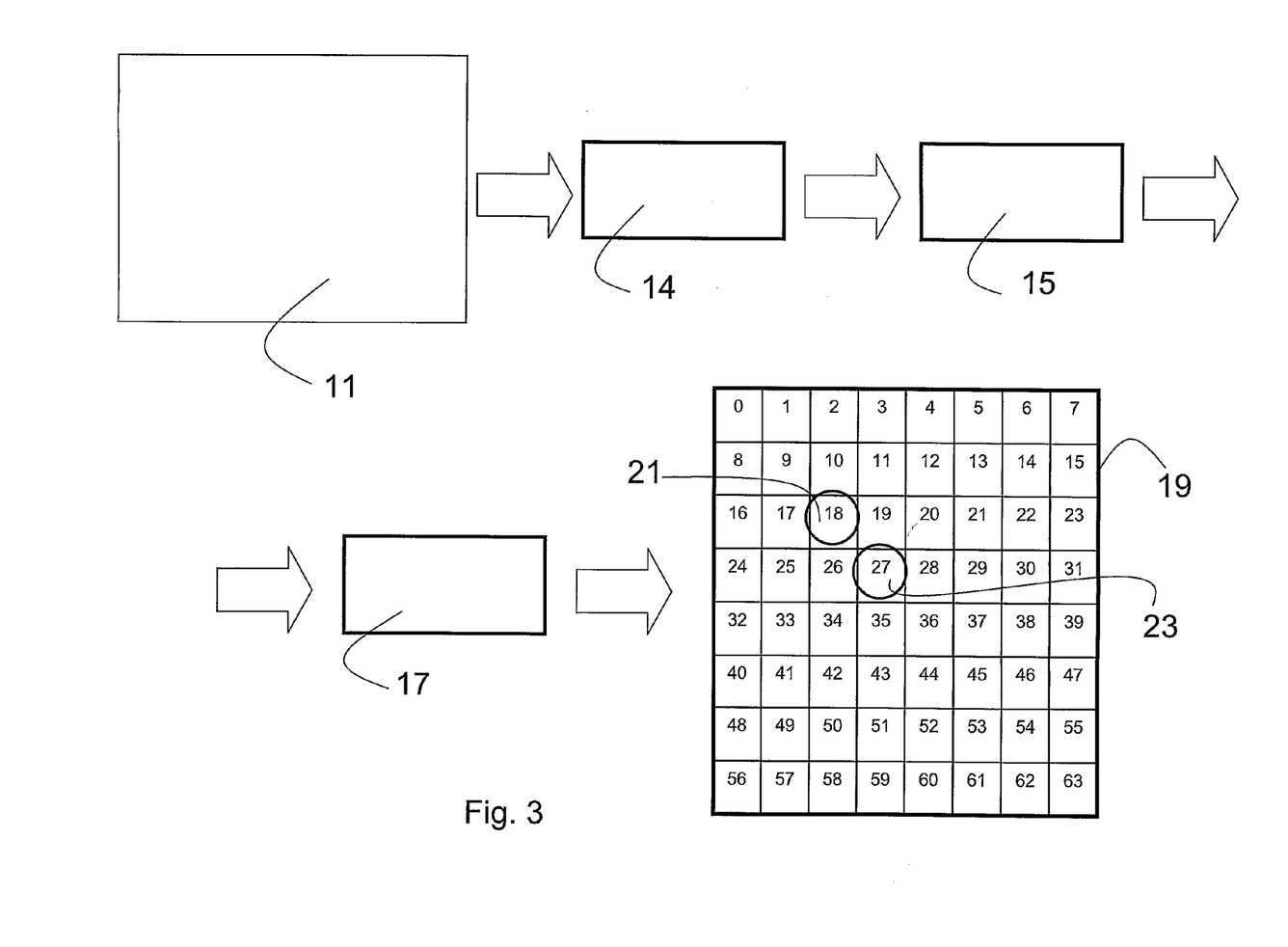
FIG. 3 shows a procedure for inserting a digital watermark into an "I" frame in the digitalized audio/video stream.

Referring now to FIG. 3, there is shown the procedure for inserting a digital watermark 5 into an "I" frame 11 of the non-encoded audio/video stream 3.

At step 14, the "I" frame 11 is first subdivided into "slices"; it is then subdivided into 64×64-sized macroblocks (step 15) and finally further subdivided into 8×8-sized blocks 19 (step 17).

For the purpose of avoiding the insertion of artifacts perceivable by the human visual system (HVS) into encoded audio/video stream 9, it is possible to modify at least one of the coefficients 21,23 of a block 19 located in two specific positions within block 19, i.e. the positions of the spatial frequencies (2,2) and (3,3), identified within block 19 with positions 18 and 27. The spatial frequencies (2,2) and (3,3) belong to the medium frequencies, to which the human eye is notoriously least sensitive.

Moreover, any modification of coefficients 21,23 is carried out only if coefficients 21,23 are other than zero, in order to avoid altering the "run-length" coding.

For example, considering a 720×576-pixel PAL-format video, there will be 6,480 8×8 blocks 19, and consequently 12,960 DCT coefficients will be available at most for inserting a digital watermark 5.

At the end of this procedure, digital watermark 5 will be incorporated into three consecutive "I" frames 11a,11b,11c. The encoding procedure, e.g. according to the MPEG-2 standard, will then proceed in the usual manner, thus outputting encoded audio/video stream 9 comprising a digital watermark 5.

The measure of using the two DCT coefficients 21,23 per block 19 located in specific positions (2,2) and (3,3) within the domain of the cosine transform DCT advantageously offers the possibility of keeping unchanged the perceptive quality of encoded audio/video stream 9 with a digital watermark 5 compared with encoded audio/video stream 9 without a watermark.

As aforementioned, the parity/non-parity of coefficients 21,23 may be forced in order to insert a "1" or "0" bit of digital watermark 5. For example, if coefficient 21 has the value "31" and the information bit of digital watermark 5 to be inserted is a "1" bit, then the value "31" will remain unchanged because the last bit of the value "31" expressed in binary format is "1", just like the value of the bit of digital watermark 5 to be inserted. Vice versa, if the bit to be inserted is a "0" bit, then the value "31" will be changed to "30" or "32" because the last bit of the values "30" and "32" expressed in binary format is a "0" bit, just like the bit of digital watermark 5 to be inserted.

The increase or decrease by a unit of spatial coefficient 21 in the position (2,2) and/or spatial coefficient 23 in the position (3,3) will generate no visible artifacts.

Thus, it is apparent from the above that two different situations may arise:
a) none of coefficients 21,23 is modified: this occurs when the last bit of coefficients 21,23 has the same value as that of an information bit required for creating digital watermark 5;
b) at least one of the two coefficients 21,23 is modified: this occurs when the last bit of coefficients 21,23 does not have the same value as that of an information bit required for creating digital watermark 5.

Figure 4:
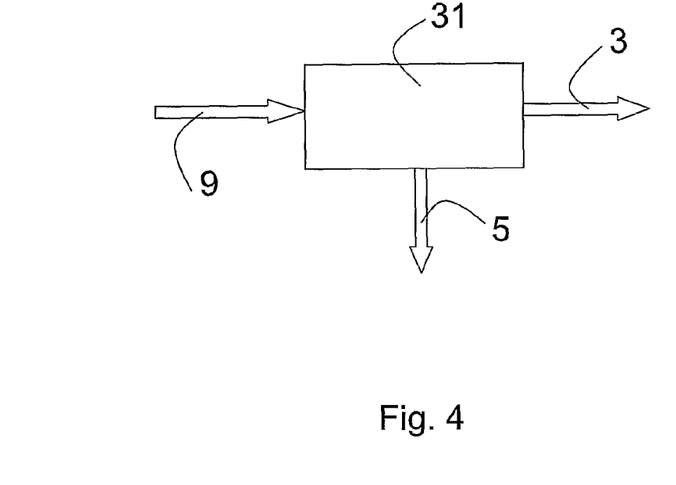
FIG. 4 shows a decoder and a step of extracting a digital watermark from an encoded audio/video stream as that of FIG. 1.

Referring now to FIG. 4, there is shown a decoder 31 for extracting a digital watermark 5 inserted in an encoded audio/video stream 9, which is inputted the encoded audio/video stream 9 in which a digital watermark 5 has been inserted, and which outputs non-encoded audio/video stream 3 and a digital watermark 5.

Figure 5:
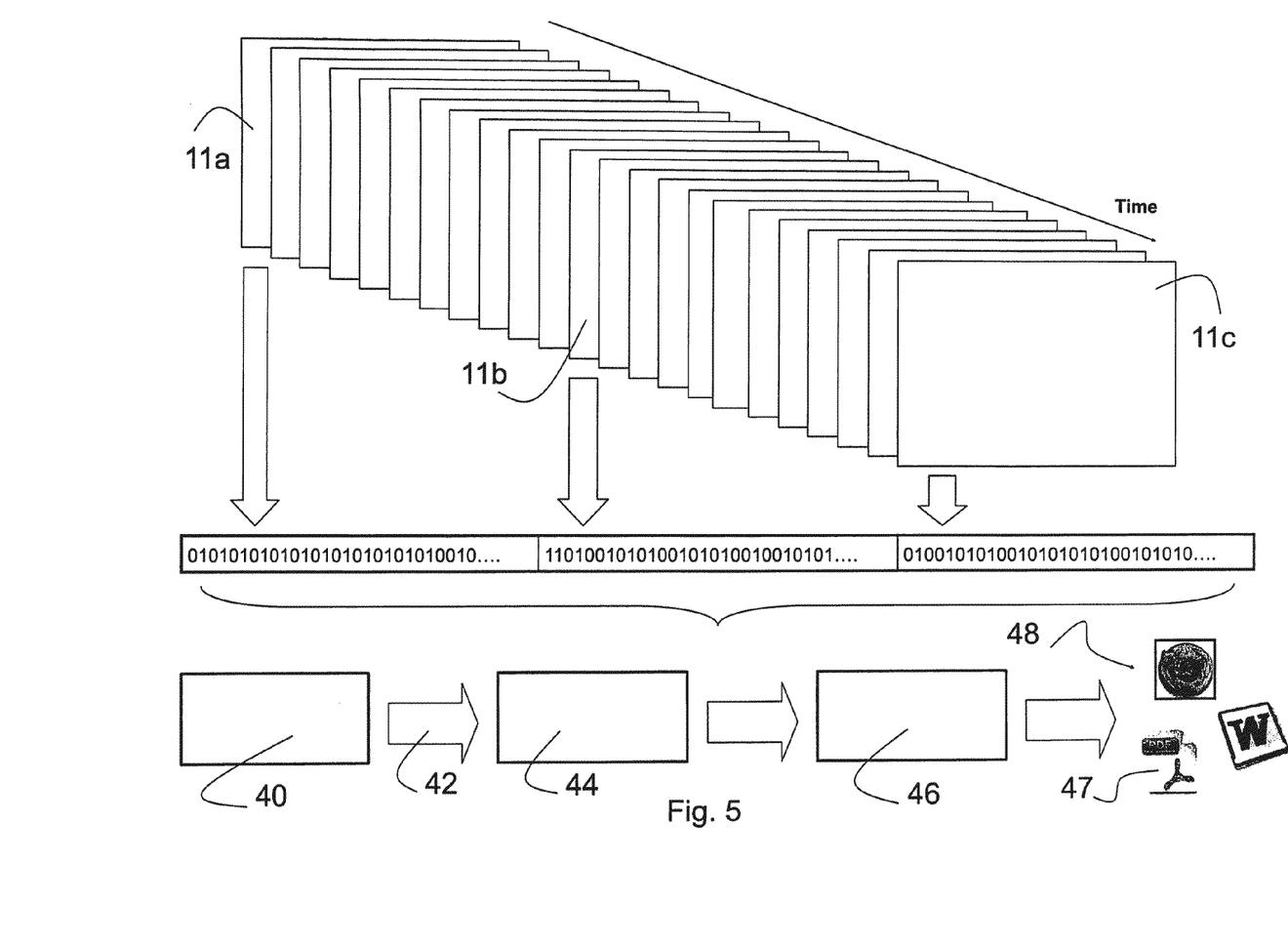
FIG. 5 is a block diagram of the watermark decoding and reading process and of the subsequent association of an application action to be executed.

FIG. 5 shows the procedure for extracting a digital watermark 5 from an encoded audio/video stream 9.

During the decoding step, e.g. according to the MPEG-2 standard, decoder 31, after having reconstructed the DCT transform from encoded audio/video stream 9, checks the non-parity/parity of the coefficients in the positions (2,2) and (3,3) of each 8×8 block of three consecutive "I" frames 11a, 11b,11c, and extracts the bits previously inserted therein.

As said bits are being read, they are stored into a memory buffer. Once three consecutive "I" frames 11a,11b,11c have been decoded, said buffer is full and contains 360 bits (step 40). At this point, the system verifies if header 5a is a header specifically used for indicating a signalling (step 42). If so, then the other 336 bits, i.e. payload 5b, represent a digital watermark 5 (step 44); otherwise, the buffer is emptied because it is not a digital watermark 5, and the procedure stops.

If it is a digital watermark 5, buffered payload 5b is compared with the codes included in a "look-up table" (step 46), which lists the actions to be carried out when a specific watermark 5 is found, such as launching applications 47, e.g. Internet, Word or PDF type. In this manner it is possible to decouple the type of application action required from the program actually used for its execution: for example, the user terminal administrator may decide that files having the ".doc" extension are to be opened by using Word or OpenOffice (or any other equivalent application that might be considered appropriate), while contents having the ".html" extension may be handled with Firefox, Internet Explorer, etc.

If the comparison between payload 5*b* and one of the codes in the look-up table is verified, then the corresponding action will be activated (step 48).

Alternatively, digital watermark 5 may be suitably structured in a manner such that it represents per se an instruction for launching an application 47 directly. For example, digital watermark 5 may carry the encoding of a specific URL ("Uniform Resource Locator") sequence and also request a specific application to be used for opening the content, e.g. Internet Explorer.

Figure 6:
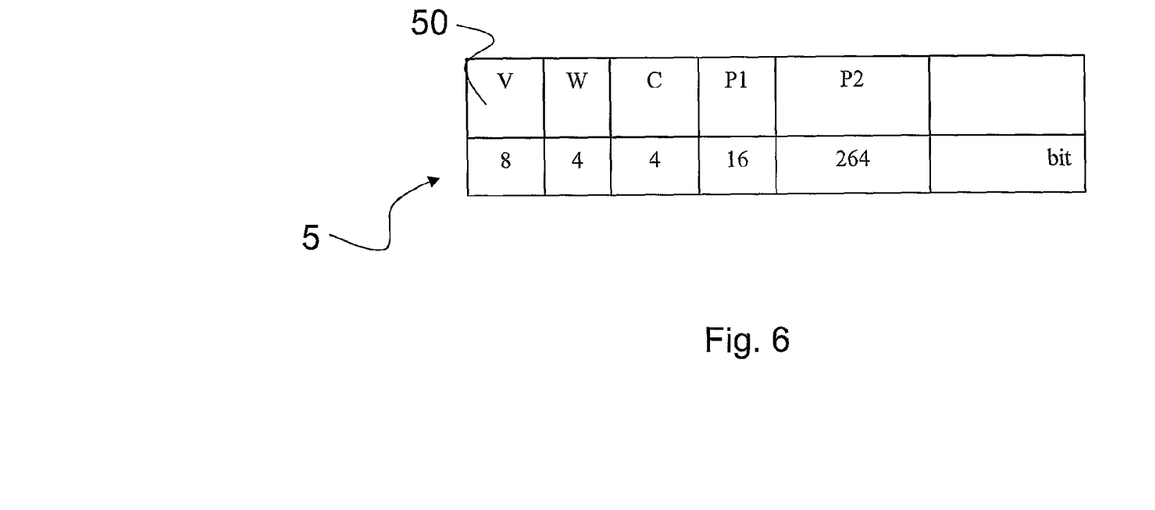
FIG. 6 shows a possible structure of a digital watermark that may be inserted into a digitalized audio/video stream.
Figure 7:
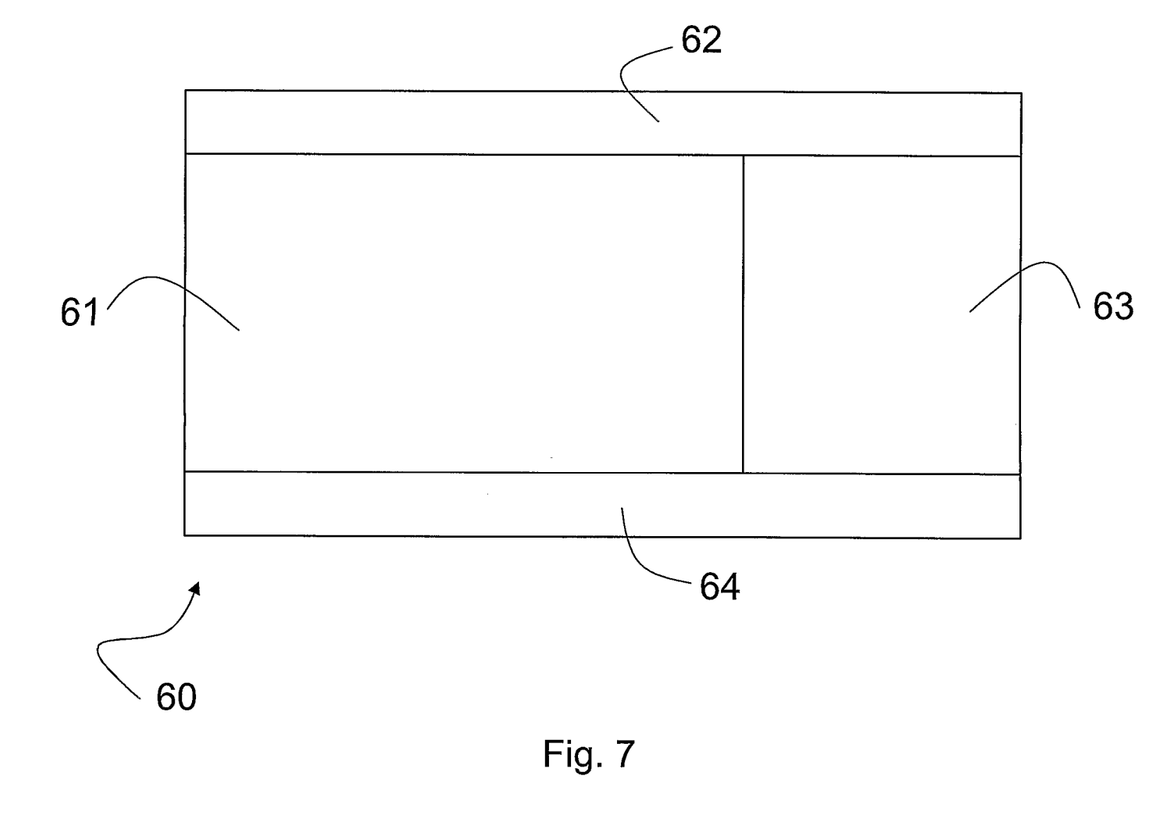
FIG. 7 shows a possible implementation of an interactive application for the fruition of an audio/video content.

FIGS. 6 and 7 illustrate an exemplifying implementation of an interactive application for the television environment which utilizes the method of the present invention, as well as a possible structure for encoding the watermark to be inserted into a non-encoded audio/video stream 3. In the illustrated example, the maximum length of the payload of digital watermark 5 is 42 bytes (336 bits).

The purpose of the interactive television application is to detect and decode the data contained in the digital watermark and to handle the graphic layout through which the data interconnected with the audiovisual content is presented to the user. Furthermore, it also allows the user to navigate through the presented data.

As shown in FIG. 7, a screen 60 of a user terminal is subdivided into four windows 61,62,63,64, one of which, i.e. window 61, is used for displaying the video content, while the other windows 62,63,64 are used for presenting the application data.

The application contents may be made available in the broadcast stream or via IP network, and then recovered from the user terminal over a return channel. The digital watermark payload may specify either the URI ("Uniform Resource Identifier") to be connected to for acquiring the application contents or else a reference to a specific file, whether transmitted in the broadcast stream or available in a "directory server" containing all references to integrative contents. In this latter case, the digital watermark payload will contain the reference to the file as well as a pointer that will allow to recover, within said file, the references to the application contents to be presented to the user at a certain time instant.

As shown in FIG. 6, watermark 5 comprises a series of fields 50 having the following meanings:

V (8 bit): version; it indicates the tag version, e.g. 0;

W (4 bit): window; it indicates an area of a screen 60 of a user terminal that is playing the audiovisual content, into which a content launched by an application 47 will have to be inserted. The possible values are 0, 1, 2 and 3, which correspond to the four windows 61,62,63,64 of FIG. 7 into which the screen 60 can be subdivided;

C (4 bit): command; it indicates how the subsequent bits shall be considered, in accordance with the following scheme:

a string "0000" indicates that the digital watermark payload is a reference to a URI from which application contents can be acquired, which URI is contained in the subsequent fields P1 and P2;

a string "0001" indicates that the payload consists of a reference to a file containing references to external contents.

In the case when the reference to the application contents is published in a single file, the value of the field P1 (16 bits) indicates the row in the file from which the URI of the content to be presented can be retrieved, whereas the value of the field P2 (264 bits) indicates the URI where the file can be retrieved.

It should be noted that, depending on the platform on which the service is provided, the graphic interface and software components may be created by using the most appropriate available tools, such as DVB-MHP and OCAP for DVB-type set top boxes, or by using the typical programming environments currently in use for user terminals based on PC architectures.

The features of the present invention, as well as its advantages, are apparent from the above description.

A first advantage is that, since the video content is encoded according to the MPEG2 or H.264 (ISO/IEC 14496-10) standards, the method according to the present invention does not jeopardize the standard compliance of the encoded content.

This means that an audiovisual content enriched by inserting a digital watermark can be distributed over the usual channels, such as broadcasting infrastructure, streaming over IP network, or storage in suitable media. As aforementioned, any users owning a decoding device as described with reference to FIG. 4 can exploit both the main content and the application data. Those users who own reproduction devices which are compliant with the decoding standard employed without however being an embodiment of the present invention will be enabled for the normal playback of the main content.

A second advantage offered by the present invention is that there are no limitations of use of said content, since the standard compliance of the encoded content is not altered at all: for example, if the encoding techniques employed are compliant with the MPEG2 standard, the content may be multiplexed into a Transport Stream and then broadcast on any digital television platform, or into a Program Stream and then used for distribution on storage media such as a DVD-type disk.

The utilizations to which the contents may or may not be assigned as a function of the specific encoding technique employed do not however represent a limitation of the present invention.

A further advantage of the present invention is that the application data, whether programming components and/or multimedia contents and/or hypermedia/hypertext contents, may be distributed along with the main content, e.g. stored in the same medium in the case of DVD production, or distributed as a datacast service, e.g. by using application protocols for unidirectional multicast file, like FLUTE, with encapsulation according to the DVB-MPE technique, in the case of broadcasting of an MPEG 2 "transport stream", or else accessible through a connection over a telecommunication channel, e.g. IP network.

An additional advantage is that the possibility of automatically identifying the type of integrative content through the aforementioned "magic number" or "mime-type" association mechanisms free the user from having to use a specific application and strictly proprietary systems: the contents are associated with application classes within which the association with a specific product can be chosen freely by the user. For example, contents identified as "text/html" may be handled, at the user's discretion, either with a simple text browser or by using products having enhanced graphic interfaces.

In this case as well, the fact that the user terminal may be more or less complex and may give the user more or less freedom in managing the resources does not represent a limitation of the present invention.

The method for referencing and interconnecting contents, applications and metadata to an audiovisual content described herein by way of example may be subject to many possible variations without departing from the novelty spirit of the inventive idea; it is also clear that in the practical implementation of the invention the illustrated details may have different shapes or be replaced with other technically equivalent elements.

For example, in order to optimize the content encoding and decoding performance of the device of the present invention, some parts of said device may be provided through hardware components, instead of software ones. Such variants are to be understood as falling within the application scope of the present invention.

It can therefore be easily understood that the present invention is not limited to the above-described method for referencing and interconnecting contents, applications and metadata to an audiovisual content, but may be subject to many modifications, improvements or replacements of equivalent parts and elements without departing from the novelty spirit of the inventive idea, as clearly specified in the following claims.

The invention claimed is:

1. Method for embedding interactive data into an audiovisual content by watermarking, said method comprising the step of inserting a digital watermark into said audiovisual content during an audiovisual content encoding step, said digital watermark being used for allowing a user to reproduce or exploit additional contents supplementing those provided by said audiovisual content, wherein said audiovisual content is an interactive television (iTV) audiovisual content, and wherein said digital watermark is inserted into said iTV audiovisual content by subdividing the digital watermark into a plurality of consecutive 'I' frames of said iTV audiovisual content.

2. Method according to claim 1, wherein said plurality of consecutive "I" frames of said iTV audiovisual content consists of three consecutive frames.

3. Method according to claim 1, wherein said digital watermark comprises a plurality of information bits and is inserted into coefficients of the Discrete Cosine Transform of said consecutive frames comprising the spatial frequencies of the Discrete Cosine Transform which are located in the positions 2,2 and/or 3,3 of an 8×8-pixel block into which each of said consecutive "I" frames is subdivided.

4. Method according to claim 3, wherein said coefficients remain unchanged if the value of the last bit of the coefficients corresponds to an information bit of the digital watermark to be inserted, whereas the coefficients are modified if the value of the last bit of the coefficients does not correspond to an information bit of the digital watermark to be inserted.

5. Method according to claim 4, wherein said modification of said coefficients of the Discrete Cosine Transform of said consecutive frames consists in modifying the parity/non-parity of said coefficients.

6. Method according to claim 4, wherein the value of said coefficients of the Discrete Cosine Transform of said consecutive frames is either increased or decreased by one unit in order to modify said parity/non-parity of said coefficients.

7. Method according to claim 6, wherein said modification is carried out only if said coefficients have a value other than zero, so as to avoid altering the "run-length" coding.

8. Encoder for referencing and interconnecting contents, applications and metadata to an audiovisual content, utilizing the method according to claim 1.

9. Method according to claim 1, wherein said plurality of consecutive "I" frames of said iTV audiovisual content consists of three consecutive frames, and wherein said digital watermark comprises a plurality of information bits and is inserted into coefficients of the Discrete Cosine Transform of said consecutive frames comprising the spatial frequencies of the Discrete Cosine Transform which are located in the positions 2,2 and/or 3,3 of an 8×8-pixel block into which each of said consecutive "I" frames is subdivided.

10. Method according to claim 9, wherein said coefficients remain unchanged if the value of the last bit of the coefficients corresponds to an information bit of the digital watermark to be inserted, whereas the coefficients are modified if the value of the last bit of the coefficients does not correspond to an information bit of the digital watermark to be inserted.

11. Method according to claim 10, wherein said-modification of said coefficients of the Discrete Cosine Transform of said consecutive frames consists in forcing the parity/non-parity of said coefficients.

12. Method according to claim 10, wherein the value of said coefficients of the Discrete Cosine Transform of said consecutive frames is either increased or decreased by one unit in order to modify said parity/non-parity of said coefficients.

13. Method according to claim 10, wherein said modification is carried out only if said coefficients have a value other than zero, so as to avoid altering the "run-length" coding.

14. Method of operation of a decoder able to decode embedded interactive data into an audiovisual content by watermarking, said method comprising the steps of:
finding a digital watermark in said audiovisual content;
comparing said digital watermark with a list of digital watermarks known to said decoder;
carrying out a certain action corresponding to said digital watermark, wherein said audiovisual content is an iTV audiovisual content, and wherein said digital watermark is subdivided into a plurality of consecutive "I" frames of said iTV audiovisual content.

15. Method according to claim 14, wherein said watermark is inserted into three consecutive "I" frames of said iTV audiovisual content.

16. Method according to claim 14, wherein said digital watermark comprises a plurality of bits and is inserted into coefficients of the Discrete Cosine Transform, said plurality of bits being located in the positions 2,2 and/or 3,3 of an 8×8-pixel block into which each of said consecutive "I" frames of said iTV audiovisual content is subdivided.

17. Method according to claim 14, further comprising the steps of storing the value of said coefficients of said plurality of consecutive "I" frames into a memory buffer associated with said decoder, and verifying if a header of said digital watermark can be found in said memory buffer.

18. Method according to claim 17, wherein the structure of said digital watermark comprises a sequence of information bits, wherein if said header is found, the sequence of information bits of said digital watermark is compared with codes contained in a look-up table and, if said digital watermark matches one of said codes, a corresponding action is carried out.

19. Method according to claim 18, wherein said corresponding action comprises the launch of an application.

20. Method according to claim 18, wherein, if said header does not refer to a digital watermark, said memory buffer is emptied and subsequent "I" frames are analyzed.

21. Method according to claim 14, wherein said digital watermark represents a Uniform Resource Identifier string, in particular a Uniform Resource Locator string.

22. Decoder for referencing and interconnecting contents, applications and metadata to an audiovisual content, utilizing the method according to claim 14.

23. User terminal comprising a decoder according to claim 22.

\* \* \* \* \*

UNITED STATES PATENT AND TRADEMARK OFFICE
CERTIFICATE OF CORRECTION

PATENT NO.       : 8,542,868 B2                                      Page 1 of 1
APPLICATION NO. : 12/808896
DATED            : September 24, 2013
INVENTOR(S)      : Ballocca et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 534 days.

Signed and Sealed this

Fifteenth Day of September, 2015

Michelle K. Lee
*Director of the United States Patent and Trademark Office*